(No Model.)
K. SMITH.
METHOD OF UNIFYING FLOUR, &c.
No. 546,830. Patented Sept. 24, 1895.
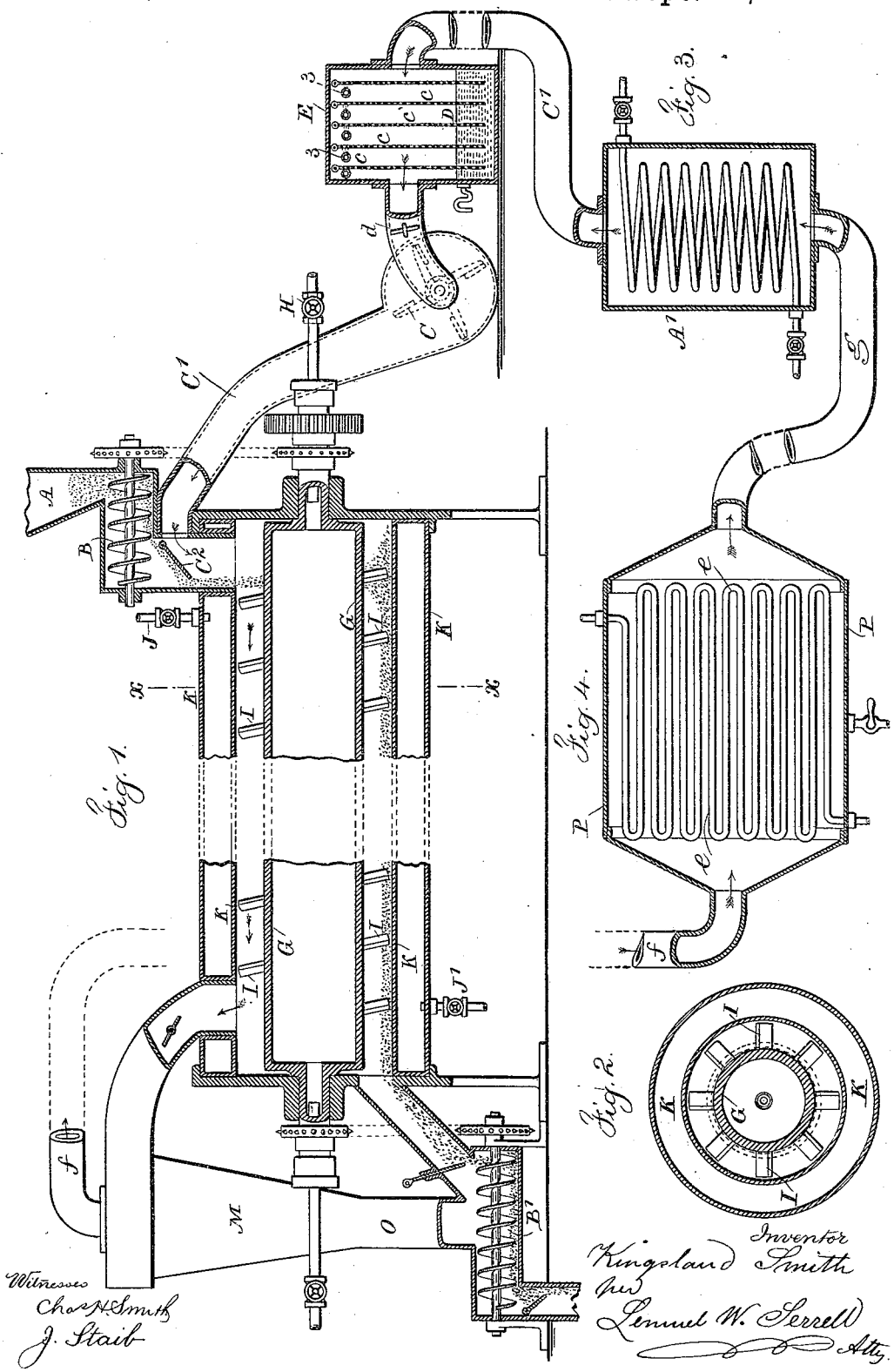
Witnesses
Chas. H. Smith
J. Staib
Inventor
Kingsland Smith
per
Lemuel W. Serrell
Atty.

UNITED STATES PATENT OFFICE.

KINGSLAND SMITH, OF ST. PAUL, MINNESOTA.

METHOD OF UNIFYING FLOUR, &c.

SPECIFICATION forming part of Letters Patent No. 546,830, dated September 24, 1895.

Application filed October 8, 1894. Serial No. 525,210. (No model.)

*To all whom it may concern:*

Be it known that I, KINGSLAND SMITH, a citizen of the United States, residing at St. Paul, in the county of Ramsey and State of Minnesota, have invented an Improvement in the Method of Unifying Flour as Placed on the Market, of which the following is a specification.

In the grinding and preparation of flour it has heretofore been well known that wheat becomes often too dry before it is ground, and the consequence is that the hull is brittle and breaks into fine particles, so that the bran is difficult to separate from the flour, and new wheat when ground often contains too much moisture and the flour is liable to sour. In addition to this the condition of the flour as it is packed into barrels varies to such an extent that some flour requires a much larger volume of water in mixing it into dough than other qualities of flour, and the taste of the bread also varies according to the condition of the flour.

The object of the present invention is to treat the grain and the flour after it is ground and before it is packed in barrels in such a manner as to render the quality of the flour uniform, or nearly so, and of the particular grade and quality desired, so that the miller is not dependent upon the character of the wheat before being ground for the character of the flour.

In carrying out this invention I have discovered that when the flour contains the requisite moisture after the wheat has been ground and when such flour is exposed to a temperature at or near that of boiling water, the moisture in the flour is so fixed and incorporated with the flour as to render the same of a uniform character adapted to a given volume of water when being mixed into dough, so that the bread may be of a given quality and taste, and this I am enabled to effect substantially regardless of the condition of the wheat before the treatment commences—that is to say, if the wheat is too old and dry I moisten it, so as to give to the wheat, and especially to the hull, sufficient moisture to prevent the same breaking up into fine particles, and thereby the bran is more easily separated from the flour, and when the flour, after being ground, is not sufficiently moist, I subject the same to the action of moist air in order that the flour may receive and contain the proper proportion of moisture, and after the flour has been ground and bolted I subject the same to the action of heat in a closed chamber for the purpose of fixing the moisture in the flour and at the same time acting upon the starch and other substances in the flour, so as to sweeten the flour and render the same of uniform quality and better adapted to the varying atmospheric conditions consequent upon transportation, and so that the flour when mixed into dough will require a definite amount of water, thus rendering the bread-making more uniform and reliable than heretofore possible.

In the drawings I have represented an apparatus adapted to the carrying out of my method.

Figure 1 is a longitudinal section of the heating apparatus. Fig. 2 is a cross-section at the line $x\ x$. Fig. 3 is a section of the air-heating apparatus. Fig. 4 is a partial section of a condensing apparatus for removing moisture from the air.

New wheat, when the season has been moist, is usually in a condition adapted to this apparatus, there being sufficient moisture present to prevent the hulls being broken into fine pieces and to facilitate the separation of the bran; but where the wheat is old, dry, and flinty it may be moistened in any suitable manner before being ground to facilitate the separation of the bran. The flour after being ground is supplied into a hopper A, and from this any suitable regular-feeding device passes the same to the heating apparatus. I have shown a feed-screw at B that is rotated by competent power, and the flour as its falls passes in between the cylinder G and the casing K. This cylinder G contains upon its surface blades or stirrers I, that move the flour gradually from the supply to the delivery end of the casing K. The casing K is made double and receives within it steam or hot water supplied by a pipe J and cock and passing off at the pipe J', and the cylinder G is made with hollow shafts or trunnions at its ends, provided with a regulating-cock H, by which steam or hot water is allowed to pass into such cylinder G to maintain the same at or about the temperature of boiling water, and I provide at the delivery end of the machine a spout and feed-screw B', the object of the feed-screws B and B' being to supply and discharge the flour regularly and at the same time keep the apparatus sufficiently tight to retain the moisture to the desired and necesssary extent.

The fan C, Fig. 1, is connected by a trunk C' to the heating apparatus A', and the flour falls upon an incline C² from the feed-screw B, so that the air driven in by the blower or fan C will come into contact with the flour as it falls from the incline C², and this air is to be either hot and dry or hot and moist, according to the condition of the flour. The air, before it is drawn into the fan C, is heated by passing through the heater A', in which there is a coil of steam-pipes, and the air is drawn from the heater A' by the fan C through a chamber E, in which chamber there are septums c of fibrous material—such as muslin or lamp-wick—through or around which the air passes from the heater A' to the fan C, and when the flour is not sufficiently moist water is supplied at D into the bottom of the chamber E, so as to saturate the septums and cause the air to take up the required amount of moisture, and by regulating the current of air by a slide d at the inlet to the fan C, the proper amount of moisture can be directed upon the flour by the heated air while such flour is in the heating apparatus. Water may be sprayed upon the septums c from perforated pipes 3. It is now to be understood that the flour and the heated or heated and moist air proceed gradually along the chamber within the casing K and around the cylinder G, and in the passage of the flour through the apparatus the same is exposed to a temperature equal to that of boiling water, or nearly so, and in this operation the moisture that is present is incorporated into the flour by the action of the heat, and the starch and gluten in the flour are also slightly changed by the heat, so that the flour is rendered uniformly sweet and also adapted to the reception of a given volume of water when being mixed into dough, and by the time the flour reaches and passes away from the delivery B' its condition is regular, as the aforesaid apparatus gives the miller the ability to reliably determine and regulate the volume of water contained in the flour, so that there is no risk of the flour being too dry or too moist, and it is only necessary to cool the flour sufficiently before packing in barrels to prevent injury by the heat present.

Where it becomes necessary to pass into the apparatus along with the flour any suitable volume of air, there is risk of carrying away with such air the finer particles of the flour. To prevent this, I connect with the upper part of the apparatus a dust-catcher. There are several of these devices on the market, one of which is known as the "Cyclone Dust-Catcher," in which the air receives a rotary or gyrating movement for the particles of flour to be thrown outwardly while the air passes away at the center. This device being well known does not require further description. I have shown a dust-catcher at M, the flour passing down by the discharge-pipe O into the case of the delivery feed-screw B'.

The air from the dust-catcher is advantageously returned to the heater A, so that there is a circulation of air without such air being discharged into the mill. I find it, however, advantageous to provide a condenser, (illustrated in Fig. 4,) in which the range of pipes e is within a case P, and water is caused to circulate through such range of pipes, and the air passing from the dust-catcher M by the pipe f enters the case P and any surplus moisture in the air is removed by condensation upon the range of pipes e, and the air goes by the pipe g to the inlet of the air-heater A'.

Any suitable mechanism may be provided for rotating the blades or stirrers I to cause them to move the flour along from the receiving to the delivery end of the apparatus. The blades may be carried by a frame (indicated by dotted lines in Fig. 2) around the cylinder G, such cylinder G remaining stationary, or the blades may be fastened upon the cylinder G and such cylinder be rotated, the devices for rotating the respective parts being of any desired character, as illustrated in Fig. 1, and do not require further description.

Spring and winter wheats have sometimes been mixed or blended together to vary the quality of the flour. This of course may be done in this apparatus, and under all circumstances it is advisable to test the amount of moisture present in the flour by weighing and then thoroughly drying such flour, so as to regulate the action of the apparatus to leave in the flour the desired percentage of moisture.

By this improvement I am enabled to prepare new flour so that it works like flour from old wheat, and according to the heat and moisture made use of, so the starch and gluten of the flour will be acted upon to render the dough more or less stiff or elastic, according to the use to which the dough is to be put, and according to the temperature to which the flour is subjected the gluten retains more or less of its power of absorption, and in this manner I am enabled to obtain flour specially adapted to the manufacture of crackers or pastry, or to adapt the flour to bread-making.

It is to be understood that according to the length of time and according to the temperature to which the flour is exposed, so the starch and gluten will be acted upon to a greater or less degree, I have found that no discoloration takes place when the flour is heated to the temperature of boiling water, and usually it is preferable to employ a temperature nearly as great as that of boiling water; but when preparing the flour for cracker-making and pastry a higher temperature is usually advantageous, or a more prolonged exposure to heat.

It is to be understood that the processes before described bring the flour into the condition and with the properties desired, and it may be packed in barrels or otherwise put up for shipping, and if it is too warm for immediate packing it may be cooled in any desired manner.

I claim as my invention—

1. The method herein specified of heating flour to render the same substantially uniform consisting in supplying such flour regularly into one end of a substantially tight vessel, moving the flour gradually from the receiving to the delivery end and simultaneously agitating and heating the same to a temperature about equal to boiling water, as and for the purposes set forth.

2. The method herein specified of preparing flour to render the same substantially uniform in quality, consisting in subjecting the flour to the action of heat about equal to that of boiling water while such flour is subjected to agitation within a substantially air-tight case, and introducing warm air to commingle with the flour, substantially as set forth.

3. The combination in an apparatus for treating flour, of a casing, means for supplying the flour at one end and discharging the same at the other end and at the same time excluding the atmosphere, means for maintaining the flour and the casing at a temperature corresponding or nearly so to that of boiling water, and means for forcing heated air in a regulated quantity into such apparatus, substantially as set forth.

4. The combination in an apparatus for treating flour, of a casing, means for supplying the flour at one end and discharging the same at the other end and at the same time excluding the atmosphere, means for maintaining the flour and the casing at a temperature corresponding or nearly so to that of boiling water, means for forcing heated air in a regulated quantity into such apparatus, a dust catcher for separating the flour from the air, and a pipe for returning the air to the fan or forcing apparatus, substantially as set forth.

5. The combination in an apparatus for treating flour, of a casing, means for supplying the flour at one end and discharging the same at the other end and at the same time excluding the atmosphere, means for maintaining the flour and the casing at a temperature corresponding or nearly so to that of boiling water, means for forcing heated air in a regulated quantity into such apparatus, a dust catcher for separating the flour from the air, a pipe for returning the air to the fan or forcing apparatus, means for supplying moisture to the heated air in its passage to the casing containing the flour, and means for condensing the surplus moisture from the atmosphere before it is returned to the heater and the fan, substantially as set forth.

6. The method herein specified of preparing flour to render the same substantially uniform in quality, consisting in subjecting the flour to the action of heat about equal to that of boiling water while such flour is subjected to agitation within a substantially air-tight case and introducing warm air and moisture to commingle with the flour, substantially as set forth.

7. The method herein specified of preparing flour to render the same substantially uniform in quality, consisting in grinding wheat that has been moistened to soften the hulls, subjecting the flour therefrom to the action of heat about equal to that of boiling water and within a substantially air-tight case and agitating such flour during the heating operation, substantially as set forth.

Signed by me this 28th day of September, 1894.

KINGSLAND SMITH.

Witnesses:
GEO. T. PINCKNEY,
A. M. OLIVER.